United States Patent [19]

Grob

[11] 4,412,666

[45] Nov. 1, 1983

[54] METHOD OF MANUFACTURE OF A SUPPORT WING AND FLAP

[76] Inventor: Burkhart Grob, Wendelsteinstrasse 8, 8023 Grosshesselohe, Fed. Rep. of Germany

[21] Appl. No.: 236,972

[22] Filed: Feb. 23, 1981

[30] Foreign Application Priority Data

Mar. 21, 1980 [DE] Fed. Rep. of Germany ....... 3010895

[51] Int. Cl.³ .............................................. B64C 3/24
[52] U.S. Cl. .................................. 244/123; 244/215; 29/416; 29/418; 29/434
[58] Field of Search ............... 244/213, 214, 215, 123, 244/124; 29/418, 416, 434; 52/82; 264/271.1, 242, 263, 279

[56] References Cited

U.S. PATENT DOCUMENTS

| 2,563,218 | 8/1951 | Darracott et al. ................... 244/123 |
| 2,604,422 | 7/1952 | Plzak et al. .......................... 156/268 |
| 2,715,598 | 8/1955 | Rees et al. ............................ 244/123 |
| 3,539,133 | 11/1970 | Robertson .......................... 244/215 |
| 3,827,661 | 8/1974 | Ryan et al. .......................... 244/123 |
| 4,247,065 | 1/1981 | Grob et al. .......................... 244/215 |

FOREIGN PATENT DOCUMENTS 1040948 9/1966 United Kingdom ............... 244/123

Primary Examiner—Sherman D. Basinger
Assistant Examiner—Rodney Corl
Attorney, Agent, or Firm—Holman & Stern

[57] ABSTRACT

In the manufacture of a supporting wing (5) with a movable flap (6) hinged to it, both covered by a plastic friction-reducing skin, a method comprising making the outer skin (1, 2) of the upper parts of the wing and flap integrally in a first mold, making the outer skins (3, 4) of the lower parts of the wing and flap in separate molds, uniting the upper and lower parts together (29, 30) and then cutting through the outer skin (8) between the upper parts of the wing and flap.

2 Claims, 3 Drawing Figures

PROCESS FLOW SHEET

METHOD OF MANUFACTURE OF A SUPPORT WING AND FLAP

BACKGROUND OF THE INVENTION

1. Field of the Invention

This invention relates to a method of manufacturing a support wing, such as an aircraft wing, having a movable flap hinged thereto whereby the support wing and the flap have at their upper and lower faces a skin of synthetic material which is formed integrally and is then cut at the upper face to allow for relative movement of the flap.

2. Description of the Prior Art

My U.S. Pat. No. 4,247,065, issued Jan. 27, 1981 describes a support or carrying wing and flap in which the flap is held in bearings, and the outer skin of synthetic material, is formed at the upper side of the wing so as to be continuous, without a gap, from the carrying surface to the flap. In a transition area between this surface and the flap the outer skin is made as a thin bendable membrane and the bearings are so constituted that the fastening of the membrane to the flap follows at least an approximately spiral path around the part at which the membrane is attached to the carrying surface.

This form of construction has the advantage of a completely unbroken outer skin at the upper side of the support or carrying wing and a correspondingly favourable airflow. Admittedly there is a break or small gap on the lower side between the flap and the support wing, but this has only a very small and negligible influence on the aerodynamic properties of the wing.

With a construction of this kind the bearings of the flap must be very accurately assembled because it is only by this means that the requisite trajectory of the fastening of the membrane to the flap can be implemented. The method of construction is therefore expensive. In the event of damage to the flap or the membrane it is difficult, and always very expensive, to reproduce the original properties.

BRIEF SUMMARY OF THE INVENTION

The object of the present invention therefore is to produce a support wing with a flap of the type first set forth above in such a way as to secure properties which approach as closely as possible to the properties of the support wing disclosed in U.S. Pat. No. 4,247,065, but in which the manufacturing expense is greatly reduced. In achieving this objective the invention starts with the method of manufacture described above.

It is already known to cut out the outer skin of the flap from the combined outer skin of the flap and wing which has been produced unitarily, the advantage being that the two parts can then fit together very accurately.

In the present invention proposes that the outer skin of the upper side of the support wing and the outer skin of the upper side of the flap are made integrally in a first mold, the jointing means between the wing and flap being disposed adjacent the outer skin. Separately from the outer skin of the upper side the outer skin of the lower side of the wing and of the flap are made and mounted in a second mold, the wing and the flap remaining substantially unconnected. The upper parts and the lower parts of the wing and flap are then connected together, and after this connection the cutting out from the upper outer skin of the flap is performed.

Whilst it has hitherto been usual, excluding however the expedients disclosed in U.S. Pat. No. 4,247,065, to premake the support wing per se and to assemble the finished wing with the separately-made flap, the present invention is based on the principle that optimum value is to be found where the support wing and the flap are processed together, since it should then be possible to obtain an optimum mutual fitting at a tolerable manufacturing expense. With the manufacture in accordance with the present invention the cut in the upper outer skin by which the flap is separated from the support wing is of minimum size, and in particular can eliminate any difference in level in the transition between the outer skin of the support wing and the outer skin of the flap. The air flow is not disturbed. Admittedly it is inevitable in carrying out the invention that a break in the outer skin will be produced during orientation of the flap, but this is equally unavoidable in all flaps which are not connected through a membrane.

Additional disturbances of the aerodynamic qualities on account of inadequate manufacturing tolerances in the individual parts are however avoided. The invention not only achieves an optimum fitting at the upper outer skin of the support wing and flap but extremely favourable fitting of the flap to the contour of the support wing at the lower outer skin can also be achieved in this invention. In particular this is achieved by the fact that the gap between the bearing wing and the flap always remains very small during the movement of the flap.

In a further development of the invention a preformed lower part of the flap is introduced into the second mold. The lower part of the flap, and the lower outer skin of the flap, can for example be made in a further mold, and then introduced into the second mold for finishing the lower part of the wing. This has the advantage that the construction of the parts of the flap which extend in the area of the gap between the support wing and the flap is greatly simplified.

During the shaping in the second mold difficulties can arise. If in carrying out the present invention the parts of the flap and the support wing are made in the second mold and are intended primarily to remain unconnected, this of course will not have to be associated with assembly expedients which for example facilitate the construction of the lower outer skin and the cooperation thereof with the lower part of the flap and which for example essentially cater for a firm connection. These assembly expedients are removed each time from the manufacture at suitable points of time.

The process of the invention produces a support wing which appears as a completely one-piece and relatively rigid structure up to the time of the cut-out step.

A further advantage which follows from the invention is the fact that any repair of a damaged flap is greatly simplified. Admittedly when replacing one flap by another flap the advantages of an exact fitting achieved by the present invention are lost, but this is tolerable in view of the fact that the repair is simplified. Moreover, using the method according to the invention there is a high degree of size tolerance between all the parts so that any deviations or size differences are kept very small in a repair of this nature.

The invention produces a support wing and flap made in accordance with the method set forth above, in which said support wing and flap are provided at the upper and lower faces with a skin of synthetic material, the upper face skins of the wing and flap being fabricated in common and thereafter separated by a cutting operation. In this improvement in which the hinging means are mounted in a first mold and the upper face skins of the wing and flap are made integrally in said first mold adjacent said hinging means, the lower face skins of the wing and flap are made on common and mounted in a second mold, the wing and flap remaining substantially unconnected, the upper and lower parts of the wing and flap are then connected together, and thereafter the combined upper face skins of the wing and flap are cut and separated. This construction which presumes a certain care in the cut-out operation has the substantial advantage that the width of the cut and the width of the gap at the upper side between the support wing and the flap may be kept very small. Even where the flap is required to undergo a substantial movement only a slight variation of the width of the cut will occur. It is clear that small gap widths are advantageous from many points of view.

BRIEF DESCRIPTION OF THE DRAWINGS

An embodiment of a support wing and flap made in accordance with the process of this invention and a process flow sheet are diagrammatically illustrated in the drawings, in which:

In FIG. 1 the upper outer skin of the support wing 5 is designated 1 and the outer skin of the flap 6 designated 2. The outer skin 1 is part of the sandwich assembly 12 disposed at the upper side of the wing, this corresponding to the assembly 13 on the lower side of the wing. The bottom outer skin of the support wing is designated 3 and the bottom skin of the flap designated 4. The assemblies 12 and 13 are connected together by a spar 14.

Figure 1:
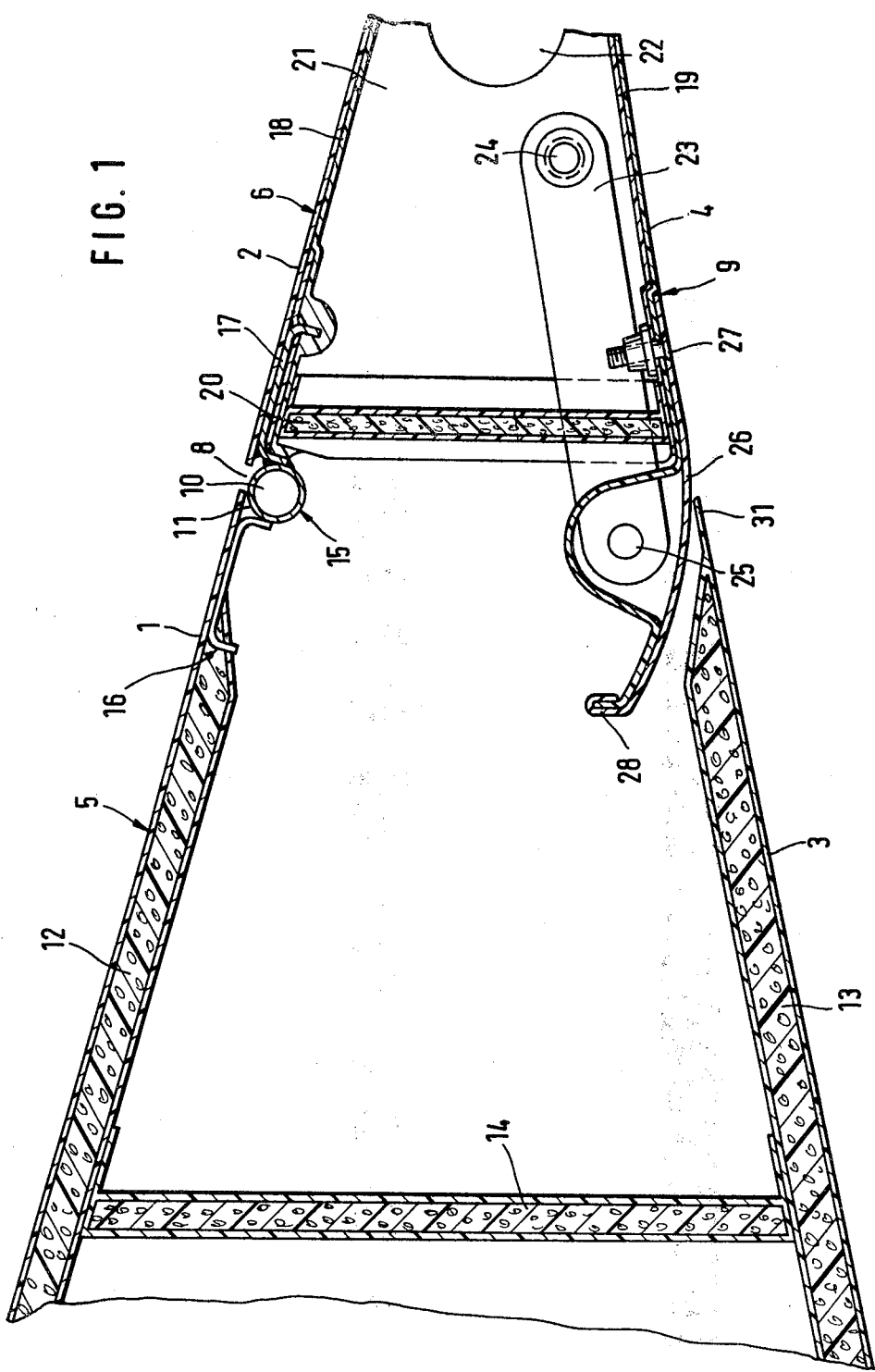
FIG. 1 is a partial cross sectional view showing a combined support wing and flap made in accordance with the present invention.

There is a break between the outer skin 1 of the wing and the outer skin 2 of the flap. The hinge joint 15 between the wing and flap primarily comprises a pivot pin 10 and bearing sleeves 11, and this joint is arrranged in the area of the break 8 and at a minimum spacing beneath the outer skins 1 and 2. Alternate bearing sleeves 11 are connected in the usual way, such as in a door hinges for example, through bar straps 16 and 17 to the support wing 5 and the flap 6 respectively.

The upper outer skin 2 of the flap 6 is reinforced by a layer 18 and the lower outer skin 4 by a layer 19. Arranged between the thus-constituted assemblies at the upper and lower sides of the flap is a strut 20 to confer appropriate stiffness to the flap.

Figure 3:
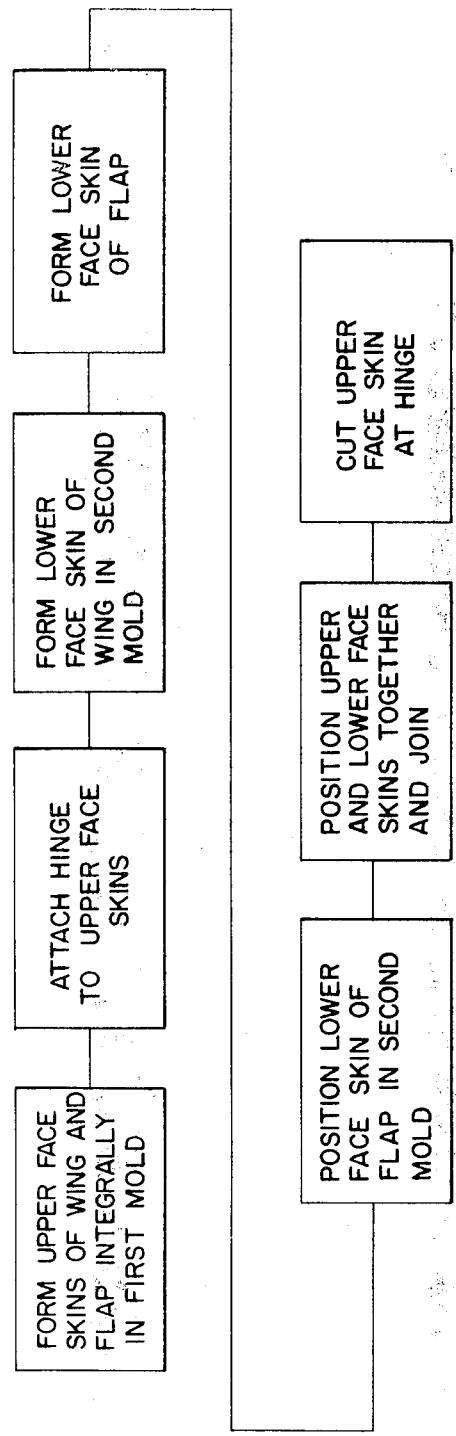
FIG. 3 is a process flow diagram showing the method of this invention in sequential steps.

In addition the flap is provided with ribs 21 each of which may be provided with a recess at 22. A link 23 is mounted on the rib 21 at a pivot 24 and a rod system (not shown) for moving the flap 6 is connected at a pivot 25. This pivot 25 is accessible by removal of the cover plate 26 held by screws 27 and clipped on at its end 28. In manufacturing the support wing and flap in accordance with the invention a complete unbroken outer skin 1, 2 is formed in a first 32 as shown in FIG. 3, the sandwich assembly 12 and the reinforcement layer 18 being brought in at the same time and similarly the joint 15 and all its associated parts. The break 8 is thus bridged over, that is to say is not yet present, at this stage of the manufacturing process.

The sandwich assembly 13 with its outer skin 3 is made in a second mould 33 as shown in FIG. 4 for example at the same time, and a lower part 9 of the flap 6, for example preformed, is introduced. This preformed lower part for example includes the outer skin 4 with the cover plate 26 and the associated parts.

The strut 20, the ribs 21 and the links 23 may be mounted optionally in the first or in the second mould, but are shown in FIG. 4 in the second mould. The same applies to the spar 14 of the support wing 5.

Figure 2:
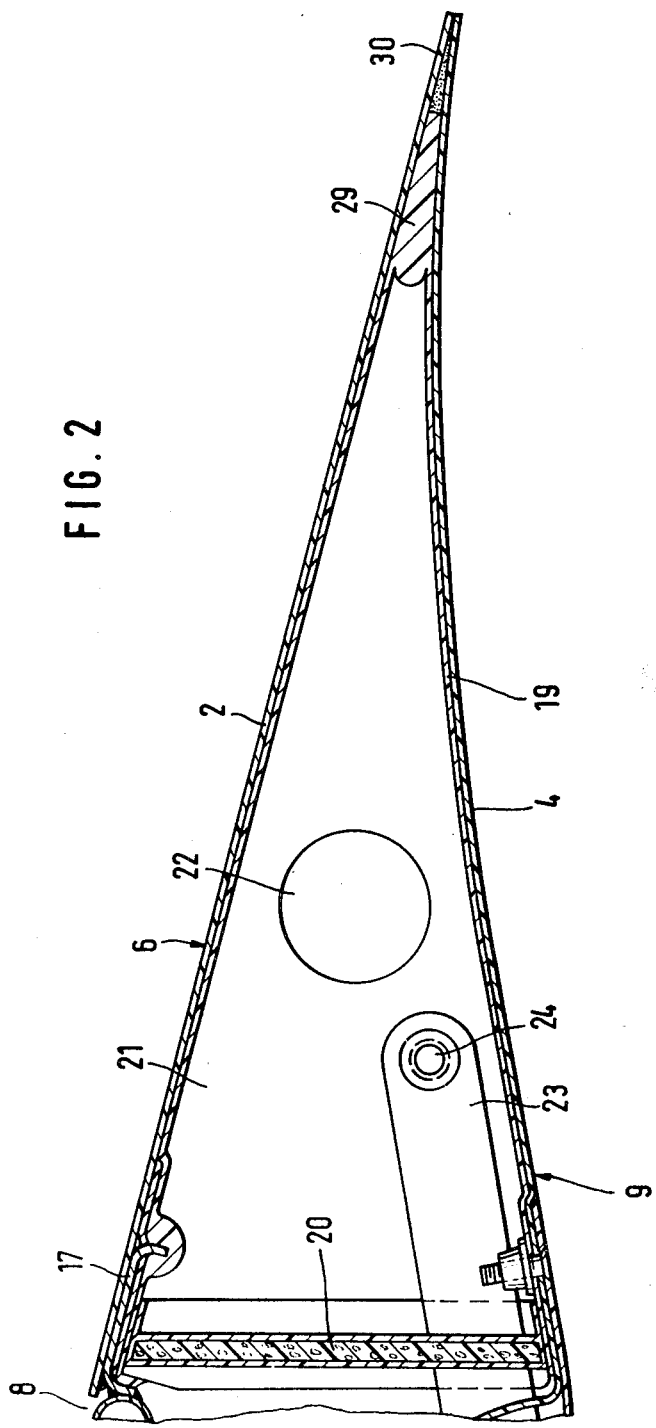
FIG. 2 is a diagrammatic cross sectional view through the entire flap of FIG. 1 showing some further parts.

The so-prepared constitutional parts of the upper and the lower shells of the finished support wing and flap are now connected together as shown in FIG. 5 and FIG. 2, use being made of the connection 29 at the end 30 of the flap.

Since at this stage the outer skins 1 and 2 have not yet been broken from one another, the flap is still immovable. After the connection has been made the break between skins 1 and 2 is made by a cut-out at 8 by means of a suitable cutter 34 as shown in FIG. 6 and the flap 6 becomes movable. The finished assembly, for example of the control rods etc. can now be completed.

It is clear that when the cover plate 26 and the adjacent parts of the outer skin 4 are given the appropriate contour, the gap between the end 31 of the outer skin 3 and the flap can be kept very small. The width of the gap can in fact be kept slightly under 1 m/m without interfering with the mobility of the flap 6.

I claim:

1. A method of manufacture of a wing assembly including a support wing having a flap connected thereto by a hinge means, and said support wing and flap having upper and lower outer faces comprised of a skin of synthetic material, comprising, forming the upper face skin of the support wing and flap integrally from a continuous sheet of material in a first mold, attaching the hinge means to said upper face skins on the inner sides thereof, forming the lower face skin of the support wing in a second mold, forming the lower face skin of the flap, positioning the lower face skin of the flap in the second mold adjacent said lower face skin of the support wing so that said lower face skins are unconnected, positioning said integral continuous upper face skins and said lower face skins together for joining to form the final assembly, joining said upper and lower face skins together, and cutting said integral continuous upper face skins to separate said upper face skin of said flap from said upper face skin of said support wing at said hinge means.

2. The method of claim 1 wherein said lower face skin of the flap is preformed and introduced into said second mold.

* * * * *